United States Patent

Eilingsfeld et al.

3,923,838
Dec. 2, 1975

[54] PRODUCTION OF CHLOROANTHRAQUINONE-2,3-DICARBOXYLIC ACID ANHYDRIDES

[75] Inventors: Heinz Eilingsfeld, Frankenthal; Wolfgang Eisfeld, Ludwigshafen; Manfred Patsch, Ludwigshafen; Ernst Schaffner, Ludwigshafen, all of Germany

[73] Assignee: Badische Anilin- & Soda-Fabrik Aktiengesellschaft, Ludwigshafen (Rhine), Germany

[22] Filed: Nov. 19, 1973

[21] Appl. No.: 417,122

[30] Foreign Application Priority Data
Nov. 18, 1972 Germany............................ 2256663

[52] U.S. Cl............ 260/346.3; 260/346.4; 260/517
[51] Int. Cl.²................. C07D 307/89; C07C 66/02
[58] Field of Search................ 260/346.4, 376, 346.3

[56] References Cited
UNITED STATES PATENTS

| | | | |
|---|---|---|---|
| 2,839,575 | 6/1958 | Fetterly................................ | 260/524 |
| 2,967,187 | 1/1961 | Serres, Jr. et al.................... | 260/376 |
| 3,089,879 | 5/1963 | Serres, Jr. et al.................... | 260/376 |
| 3,726,914 | 4/1973 | Engenbrecht et al............... | 260/524 |

OTHER PUBLICATIONS
Cram et al. Organic Chemistry (New York) McGraw–Hill 1959 p. 310.
Howben–Weyl, "Methoden der Organischen Chemie" 4th Edition, Vol. 8(1957) p. 386–388.

*Primary Examiner*—Henry R. Jiles
*Assistant Examiner*—Bernard I. Dentz
*Attorney, Agent, or Firm*—Johnston, Keil, Thompson & Shurtleff

[57] ABSTRACT

A process for the production of an anthraquinone-2,3-dicarboxylic anhydride bearing chlorine as a substituent in the 1-position or in the 1- and 4-positions by oxidation of a trimethyl compound of the formula:

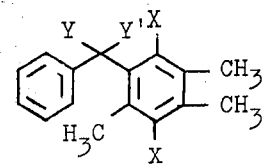

in which one X is chloro and the other X is hydrogen or each X is chloro; and

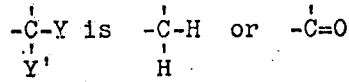

with air or oxygen or with 10 to 30% by weight nitric acid to form the corresponding carboxylic acid followed by cyclization of the latter. 1-chloroanthraquinone-2,3-dicarboxylic anhydride or 1,4-dichloroanthraquinone-2,3-dicarboxylic anhydride is obtained in a good yield. Each is a valuable dye intermediate.

10 Claims, No Drawings

PRODUCTION OF CHLOROANTHRAQUINONE-2,3-DICARBOXYLIC ACID ANHYDRIDES

The invention relates to a process for the production of chloroanthraquinone-2,3-dicarboxylic anhydrides.

We have found that a chloroanthraquinone-2,3-dicarboxylic anhydride of the formula (I):

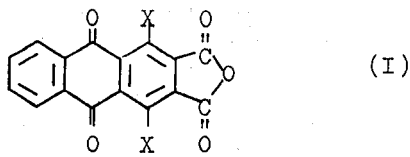

in which one X is chloro and the other X is hydrogen or in which each X is chloro is obtained in a good yield by oxidizing a trimethyl compound of the formula (II):

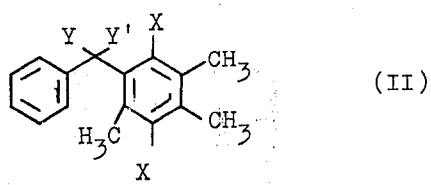

in which the group

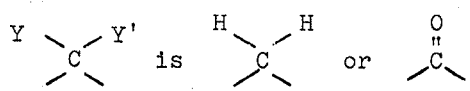

and X has the above meanings into the tricarboxylic acid and cyclizing the oxidation product by means of a water-eliminating agent at from 120° to 280°C.

The tricarboxylic acids obtained in the oxidation have the formula (III):

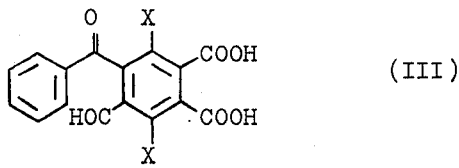

in which the X's have the above meanings. During the ensuing cyclization, elimination of water takes place at the same time to form the dicarboxylic anhydride.

Examples of starting compounds (II) for the process of the invention are:
2,5-dichloro-3,4,6-trimethylbenzophenone,
2,5-dichloro-3,4,6-trimethyldiphenylmethane,
5-chloro-3,4,6-trimethylbenzophenone,
2-chloro-3,4,6-trimethyldiphenylmethane and
5-chloro-3,4,6-trimethyldiphenylmethane.

$\underset{\diagdown}{\overset{Y}{\diagup}}C\underset{\diagdown}{\overset{Y'}{\diagup}}$ is preferably $\underset{\diagdown}{\overset{O}{\diagup}}C\underset{\diagdown}{}$ Accordingly preferred starting compounds (II) are:
2,5-dichloro-3,4,6-trimethylbenzophenone and
5-chloro-3,4,6-trimethylbenzophenone.

Production of the trimethyl compounds of formula (II) is accomplished by reacting
A. 2,4,5-trimethylbenzophenone or
B. 2,4,5-trimethyldiphenylmethane with chlorine in a solvent and preferably with a halogenation catalyst. The chlorination reaction of (A) proceeds well in the presence of iodine and/or an iron compound as a halogenation catalyst with the initial reactant suspended in an inert organic solvent such as glacial acetic acid or trichloroethylene at temperatures of −10°C. to +140°C., especially at 80°C. to 120°C. to produce the 3,6-dichloro compound and at −5°C. to +50°C. to produce the 3-monochloro compound. The chlorination reaction of (B) proceeds in the presence of iodine as a catalyst and in an inert organic solvent such as trichloroethylene at temperatures of −20°C. to +200°C., conveniently from −10°C. to +100°C. and preferably from 0°C. to 30°C. The desired products can be isolated by distillation under a vacuum.

The process of the invention is carried out by oxidizing the trimethyl compound in a first stage either with air, oxygen or a mixture of the same in the presence of cobalt salts, manganese salts or a mixture of the same as catalysts in an organic solvent which is stable under the reaction conditions at atmospheric or superatmospheric pressure at a temperature of from 40° to 180°C or in 10 to 30% by weight aqueous nitric acid at a temperature of from 150° to 250°C at superatmospheric pressure and then in a second stage cyclizing the isolated tricarboxylic acid (III) by means of an agent eliminating water to form the anthraquinone derivative (I).

Oxidation of (II) in an organic solvent which is stable under the reaction conditions takes place in the presence of a catalyst such as a manganese salt or cobalt salt or a mixture of the two in the presence or absence of an alkali metal bromide with air and/or oxygen at atmospheric or superatmospheric pressure at a temperature of from 40° to 180°C.

Solvents of high boiling point such as dichlorobenzene or trichlorobenzene and preferably an aliphatic carboxylic acid such as acetic acid, propionic acid, butyric acid or valeric acid are suitable as solvents for the oxidation with oxygen or air which are stable under the reaction conditions.

In order to achieve a rapid reaction the oxidation with air/oxygen is carried out at atmospheric pressure and conveniently at a temperature of from 120° to 180°C using valeric acid or butyric acid as solvent. If the oxidation is carried out at superatmospheric pressure the oxidation takes place even at temperatures of 40°C and at a satisfactory rate at temperatures above 80°C. In this case the temperature range from 80° to 150°C is preferred.

The amount of solvent is generally from three to twenty times and preferably from 5 to 10 times that of the compound (II) to be oxidized.

The manganese salts and cobalt salts to be used as catalysts are preferably used in the form of acetates and/or bromides, in the presence or absence of an alkali metal bromide. The amount of catalyst is generally from 0.1 to 10% by weight and preferably from 0.5 to 4% by weight based on the compound (II) to be oxidized.

The acid is isolated after the oxidation by distilling off the solvent. It is usually in the form of an oil and may be purified by dissolution and reprecipitation or by recrystallization.

Oxidation of the trimethyl compound (II) with 10 to 30% by weight aqueous nitric acid is generally carried out at a temperature of from 150° to 250°C and preferably at from 170° to 220°C at superatmospheric pressure. The amount of nitric acid is as a rule from 2 to 10 moles and preferably from 2.5 to 4 moles of nitric acid per equivalent of methyl groups. The reaction temperature depends on the concentration of the nitric acid used and particularly on the trimethyl compound (II) according to whether the latter contains one halogen atom or two halogen atoms in ortho-position to the methyl groups.

An advantageous variant of the oxidation with nitric acid consists in carrying out the oxidation in two stages. First oxidation of the trimethyl compound (II) is begun at temperatures of from 100° to 150°C and then the oxidation is completed at temperatures of from 170° to 220°C. This oxidation in stages has the advantage that an about 5 to 15% higher yield of the tricarboxylic acid (III) is achieved and consequently a correspondingly increased yield of the chloroanthraquinone-2,3-dicarboxylic anhydride is also achieved.

Another variant of the oxidation of (II) consists in first oxidizing the trimethyl compound (II) with air or oxygen at from 80° to 150°C in an aliphatic carboxylic acid as described above until at least 3 moles of oxygen has been absorbed, precipitating the partially oxidized product for example by stirring the solution into water, isolating it and oxidizing (subsequent oxidation) the isolated partially oxidized products by a known method with permanganate in alkaline aqueous solution, with chromic acid in sulfuric acid or preferably with 10 to 30% by weight aqueous nitric acid at superatmospheric pressure as described above to form the tricarboxylic acid.

Subsequent oxidation with permanganate is carried out in 5 to 15% by weight sodium carbonate solution in which the partially oxidized compound is dissolved. The solution is heated to boiling point and at least twice the equivalent amount of potassium permanganate for each methyl group to be oxidized is added. After the permanganate color has disappeared the manganese dioxide which has been deposited in the reaction is separated and the filtrate has concentrated hydrochloric acid added to it so that the tricarboxylic acid is precipitated. The precipitate is suction filtered, washed with a small amount of water and dried.

Subsequent oxidation with chromium (VI) compounds is carried out by dissolving the partially oxidized compound in five to ten times its weight of concentrated sulfuric acid or acetic acid and heated with twice to three times the amount of chromium (VI) compound such as sodium dichromate or potassium dichromate or potassium chromate for two hours at from 80° to 100°C. The tricarboxylic acid is then isolated by pouring into ice and water.

The amount of nitric acid in the subsequent oxidation is generally from 2 to 10 moles and preferably from 2.5 to 4 moles per equivalent of methyl groups still present. The oxidation is carried out under the same conditions as oxidation in one stage.

Cyclization of the tricarboxylic acid (III) obtained by oxidation (formation of the anhydride taking place at the same time) is carried out by means of a water-eliminating agent such as polyphosphoric acid or preferably concentrated sulfuric acid or oleum with up to 25% by weight of sulfur trioxide. The water-eliminating agent is generally used in an amount which is 3 to 25 times and preferably from 5 to 10 times the weight of the tricarboxylic acid (III). When concentrated sulfuric acid or oleum is used it is convenient to use an excess of acid which serves at the same, time as a solvent. When polyphosphoric acid is used as water-eliminating agent the cyclization may also be carried out in an inert organic solvent such as trichlorobenzene or nitrobenzene. The amount of solvent is conveniently from 3 to 25 times that of the tricarboxylic acid.

Cyclization is carried out at a temperature of from 120° to 280°C and preferably from 140° to 230°C.

Processing of the cyclization mixture is carried out (when sulfuric acid or oleum has been used as the water-eliminating agent) by pouring the reaction mixture into ice and water so that the chloroanthraquinone-2,3-dicarboxylic acid is precipitated and is isolated by a conventional method.

Processing after cyclization with a polyphosphoric acid as the water-eliminating agent is conveniently carried out by stirring the reaction mixture into ice and water. Any solvent used is distilled off with steam and the reaction product is isolated from the aqueous residue.

Oxidation of benzophenones bearing methyl groups as substituents into the corresponding carboxylic acids is known in principle for example from U.S. Pat. No. 2,967,187. This patent however relates only to benzophenones which contain only methyl groups as substituents. According to Houben-Weyl, "Methoden der organischen Chemie", 4th edition, volume 8 (1957), pages 387 and 388, it was to be expected that the oxidation of methyl groups attached to aromatic nuclei would not take place if halogen and methyl are in the orthoposition to one another.

Thus the trimethyl compounds of formula (II) cannot be oxidized direct into the corresponding tricarboxylic acids either with chromic acid in sulfuric acid or acetic acid or else with permanganate in alkaline or acid solution. It could therefore not be foreseen that oxidation with air or oxygen in the presence of manganese salts and/or cobalt salts in aliphatic carboxylic acids or the oxidation with nitric acid would result in the tricarboxylic acids.

The products of the process are intermediates for the production of valuable disperse dyes and vat dyes.

The following Examples will further illustrate the process of the invention. The parts and percentages specified are by weight. Parts by volume have the same relationship to parts by weight as the liter to the kilogram.

EXAMPLE 1 a. Oxidation 30 parts of 2,5-dichloro-3,4,6-trimethylbenzophenone is dissolved in 180 parts of propionic acid and then 0.5 part of cobalt acetate, 0.5 part of manganese acetate and 0.15 part of cobalt bromide are added. 350,000 parts by volume of oxygen is passed through this solution during from 5 to 6 hours at 140°C. The propionic acid is then distilled off. The oil which remains is taken up in dilute caustic soda solution and reprecipitated with dilute hydrochloric acid. The partially oxidized compound (chlorine content 18.5%) is isolated by decanting off the supernatent solution. It is heated in 180 parts of water and 42 parts of nitric acid (100%) in a tantalum autoclave for 6 hours at 190°C. It is then allowed to cool, the solution is concentrated, the residue is taken up in dilute caustic soda solution, freed from residue by filtration and the 2,5-dichlorobenzophenone-3,4,6-tricarboxylic acid is precipitated in the filtrate with dilute hydrochloric acid. The tricarboxylic acid is dried in vacuo. The yield is 32.3 parts having a melting point of 185° to 187°C; this is equivalent to 82.4% of theory.

After the acid has been recrystallized from water it melts at 238° to 245°C with decomposition and at about 160°C plainly the anhydride is formed with elimination of water.

b. Cyclization 7 parts of 2,5-dichlorobenzophenone-3,4,6-tricarboxylic acid is heated in 40 parts of concentrated sulfuric acid for 3 minutes at 190° to 200°C. It is then allowed to cool, poured onto 250 parts of ice, suction filtered and washed with a small amount of alcohol. The yield is 5.3 parts of 1,4-dichloroanthraquinone-2,3-dicarboxylic anhydride having a melting point of 343° to 345°C (equivalent to 83.5% of the calculated yield).

By replacing the 2,5-dichloro-3,4,6-trimethylbenzophenone with 26 parts of 5-chloro-3,4,6-trimethylbenzophenone, 1-chloroanthraquinone-2,3-dicarboxylic acid anhydride is obtained according to (a) and (b) in a similar yield.

EXAMPLE 2

Direct oxidation with oxygen

The apparatus used is a heated titanium autoclave having a volumetric capacity of 1500 parts by volume which is fitted with an impeller having a speed of 1200 rpm, a baffle, an air inlet pipe, a reflux condenser and constant pressure means. A solution of 140 parts of 2,5-dichloro-3,4,6-trimethylbenzophenone, 600 parts of glacial acetic acid, 20 parts of water, 2 parts of cobalt bromide and 1 part of manganese bromide is heated in the apparatus in 180°C and gassed at this temperature for 4.5 hours with 2000 parts by volume (STP) of air per minute under the autogenous pressure. Then acetic acid and water are distilled off and the brown residue is recrystallized from water. The yield is 125 parts of 2,5-dichlorobenzophenone-3,4,6-tricarboxylic acid. The melting point is 238° to 245°C with decomposition. The yield is equivalent to 68.5% of the calculated yield.

EXAMPLE 3

Oxidation with nitric acid in two temperature stages 20 parts of 2,5-dichloro-3,4,6-trimethylbenzophenone in 120 parts of water and 28 parts of nitric acid (100%) is heated in a tantalum autoclave for 3 hours at 150°C and then for 3 hours at 190°C. Then the yellowish solution is evaporated to dryness. 24.1 parts of 2,5-dichlorobenzophenone-3,4,6-tricarboxylic acid remains, corresponding to 90% of the calculated yield. After it has been recrystallized with water it melts at 238° to 245°C with decomposition.

EXAMPLE 4

Preoxidation with oxygen followed by afteroxidation with potassium permanganate 30 parts of 2,5-dichloro-3,4,6-trimethylbenzophenone is preoxidized as described in Example 1 and further oxidized as follows: the partially oxidized compound is taken up in 200 parts of water, 24 parts of sodium carbonate is added and the whole is heated to 90° to 100°C. A total of 20 parts of potassium permanganate is added to this solution over three hours. The whole is further stirred at this temperature for half an hour, filtered hot to free it from manganese dioxide, and the filtrate is cooled and acidified with concentrated hydrochloric acid while cooling. 10.5 parts of 2,5-dichlorobenzophenone-3,4,6-tricarboxylic acid crystallized out; another 7.6 parts can be isolated from the filtrate. The total yield is 24.1 parts, equivalent to 61.8% of theory. The melting point is 238° to 245°C with decomposition.

EXAMPLE 5

30 parts of 2,5-dichloro-3,4,6-trimethyldiphenylmethane is preoxidized as described in Example 1 and then further oxidized with potassium permanganate as described in Example 4. After processing 10.2 parts of 2,5-dichlorobenzophenone-3,4,6-tricarboxylic acid is obtained having a melting point of 238° to 245°C with decomposition.

EXAMPLE 6

3 parts of 2,5-dichlorobenzophenone-3,4,6-tricarboxylic acid (obtained according to Example 2 or 3) is heated in 30 parts of polyphosphoric acid ($P_2O_5$ content: 81%) for 5 hours at 180°C. The mixture is then poured into ice water. The deposited product is suction filtered, washed with water and dried. 2.5 parts of crude 1,4-dichloroanthraquinone-2,3-dicarboxylic anhydride which is purified by sublimation at subatmospheric pressure (290°C/1 mm).

The yield is 1.6 parts of pure 1,4-dichloroanthraquinone-2,3-dicarboxylic anhydride, equivalent to 59% of the calculated yield. The melting point is 243° to 245°C.

We claim:

1. A process for the production of a chloroanthraquinone-2,3-dicarboxylic acid anhydride of the formula:

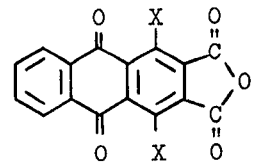

in which one X is chlorine and the other X is hydrogen or both X's are chlorine wherein a trimethyl compound of the formula:

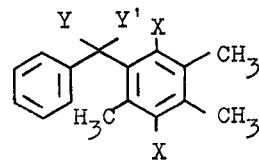

in which the group

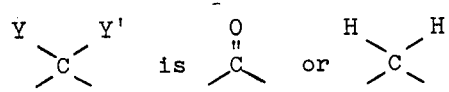

and X have the above meanings is oxidized into the tricarboxylic acid by oxidation with air, oxygen or a mixture of the same or with 10 to 30% by weight nitric acid and the oxidation product is cyclized by means of a water-eliminating agent at 120° to 280°C.

2. A process as claimed in claim 1 wherein the oxidation is carried out in an organic solvent which is stable under the reaction conditions in the presence of a cobalt salt, a manganese salt or a mixture of the same with air, oxygen or a mixture of the same at atmospheric or superatmospheric pressure at a temperature of from 40° to 180°C.

3. A process as claimed in claim 2 carried out in the presence of an alkali metal bromide.

4. A process as claimed in claim 2 wherein the oxidation is carried out in an aliphatic carboxylic acid of two to six carbon atoms.

5. A process as claimed in claim 2 wherein the oxidation is carried out at 80° to 150°C.

6. A process as claimed in claim 4 wherein the oxidation is carried out at 80° to 150°C.

7. A process as claimed in claim 1 wherein the oxidation is carried out with 10 to 30% by weight aqueous nitric acid at a temperature of from 150° to 250°C at superatmospheric pressure.

8. A process as claimed in claim 1 wherein the trimethyl compound is first oxidized in an aliphatic carboxylic acid in the presence of a manganese salt, a cobalt salt or a mixture of the same with or without alkali metal bromide with air or oxygen until at least 3 moles of oxygen has been absorbed per mole of starting compound and the partly oxidized product is further oxidized with permanganate in alkaline solution, with chromic acid in sulfuric or acetic acid or with nitric acid at superatmospheric pressure and then the oxidation product is cyclized.

9. A process as claimed in claim 1 wherein the cyclization is carried out in the presence of sulfuric acid, oleum or polyphosphoric acid.

10. A process as claimed in claim 1 wherein 2,5-dichloro-3,4,6-trimethylbenzophenone, 2,5-dichloro-3,4,6-trimethyldiphenylmethane or 5-chloro-3,4,6-trimethylbenzophenone is oxidized.

* * * * *